United States Patent

Hidai et al.

[11] Patent Number: 6,056,109
[45] Date of Patent: *May 2, 2000

[54] METHOD FOR MOUNTING FOOD, AND APPARATUS THEREFOR

[75] Inventors: Masatoshi Hidai; Yasuhiko Sano, both of Tochigi, Japan

[73] Assignee: Rheon Automatic Machinery Co., Ltd., Utsunomiya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,526

[22] Filed: Mar. 28, 1997

[30] Foreign Application Priority Data

Mar. 30, 1996 [JP] Japan .................................. 8-103996
Jan. 18, 1997 [JP] Japan .................................. 9-020131

[51] Int. Cl.[7] .................................................. B65G 47/26
[52] U.S. Cl. ........................... 198/431; 198/572; 198/588
[58] Field of Search ................... 198/812, 588, 198/571, 572, 434, 437, 431

[56] References Cited

U.S. PATENT DOCUMENTS

| | | | |
|---|---|---|---|
| 3,106,280 | 10/1963 | Baker | 198/812 |
| 3,548,895 | 12/1970 | Gentry, Jr. | 198/812 |
| 3,759,126 | 9/1973 | Burgess | 198/812 |
| 4,210,237 | 7/1980 | Gram | 198/812 |
| 4,281,757 | 8/1981 | Morton | 198/812 |
| 4,684,008 | 8/1987 | Hayashi et al. | 198/431 |
| 4,821,870 | 4/1989 | Simelunas et al. | 198/812 |
| 5,123,231 | 6/1992 | Fallas et al. | |
| 5,322,154 | 6/1994 | Lenherr | 198/812 |
| 5,383,760 | 1/1995 | Cawley et al. | 198/588 |
| 5,637,183 | 6/1997 | Borner | 198/812 |
| 5,796,052 | 8/1998 | Christmann | 198/812 |

FOREIGN PATENT DOCUMENTS

| | | |
|---|---|---|
| 0 057386 | 8/1982 | European Pat. Off. . |
| 0 104 142 | 3/1984 | European Pat. Off. . |
| 0190906 | 8/1996 | European Pat. Off. . |
| 2 478 043 | 9/1981 | France . |
| 6-8105 | 3/1994 | Japan . |
| 648 258 | 3/1985 | Switzerland . |

*Primary Examiner*—Gregory A. Morse
*Attorney, Agent, or Firm*—Finnegan, Henderson, Farabow, Garrett & Dunner, L.L.P.

[57] ABSTRACT

A method for mounting food products or the like, has the steps of: (a) transferring food products on a continuously moving conveyor in a column; (b) detecting the food product by a food product detecting sensor attached to a predetermined position of the conveyor, wherein each food product is transferred with position data thereof given by a control unit; and (c) mounting each food product at a preset position on a receiving surface with a food product discharge end section of the conveyor being caused to withdraw at a speed corresponding to the position data thereof.

12 Claims, 7 Drawing Sheets

METHOD FOR MOUNTING FOOD, AND APPARATUS THEREFOR

BACKGROUND OF THE INVENTION

The present invention relates to an apparatus that mounts articles such as bread, cakes, and other food materials (hereinafter referred to as the "food products" where applicable) so as to be lined up onto a packaging container, a baking tray, a belt conveyor, a band oven, and the like, and that delivers the food products that have been mounted in the lined up way to downstream processes in a manufacturing line along which food products are being transferred in a column or in a plurality of columns at irregular intervals.

Even if automatically made confections are to be continuously transported at an equal interval during the process of manufacturing bread, confections, or the like, such equal interval at which the confections are pitched may, in some cases, be lost due to defective operation during intermediate processes such as slippages during powder shake-down operation, forming process, or delivery between conveyors. Confections put at such irregular intervals must be lined up at the regular equal interval if such irregular intervals are considered no longer allowable in the downstream processes such as baking process and packaging process.

This lining-up operation has commonly been performed in mounting process.

The following two systems are mainly known in conventional mounting units.

(a) One system is such that a group of food products is mounted onto a receiving surface arranged under a discharge end section of a food product transferring conveyor after the discharge end section has been caused to withdraw a full stroke at a fixed speed.

(b) The other system is such that food products are mounted onto a receiving surface one by one first by causing a discharge end section of a food product transferring conveyor to withdraw a predetermined distance every time a single food product has been detected by a food product detecting sensor arranged in the proximity of the discharge end section, and then by causing the discharge end section to wait in stoppage for a next food product.

Although commonly employed, the system (a) is disadvantageous in that a lining-up function is not provided. Therefore, under this system, food products that are transferred at irregular intervals are mounted at the same irregular intervals.

One example of the system (b) is disclosed in Japanese Utility Model Publication No. Hei. 6-8105.

This system provides the advantage of lining food products up, but is disadvantageous in requiring a stop time during the withdrawing operation of the discharge end section. Therefore, the withdrawing speed of the discharge end section must be increased so as to compensate for the stop time.

In this case, the discharge end section stops abruptly, and therefore receives enormous mechanical impact. Further, even if food products are transferred at an equal interval, this system still has to take care of similar mechanical burden due to such intermittent stoppage of the discharge end section that occurs regularly.

Still further, any system, not restricted to both systems (a) and (b), that has a food product detecting sensor arranged in the proximity of the axially moving discharge end section not only has to encounter the problem that an electric cable connecting the detecting sensor to a control unit is broken due to fatigue associated with the repeated axial movement of the discharge end section, but also requires preventive maintenance in which the old cable is replaced with a new one to prevent such breakage.

SUMMARY OF THE INVENTION

The present invention has been made to overcome the aforementioned problems.

An object of the present invention is therefore to provide a method and apparatus that, when food products are being transported at irregular intervals, transfers the food products while lining such food products up by continuously withdrawing a discharge end section mildly without giving drastic mechanical impact to the discharge end section.

The present invention is to overcome the aforementioned problems by a method of transform food products or the like, in which food products being transported on a continuously moving conveyor in a column are detected by a food product detecting sensor attached to a predetermined position of the conveyor, so that each food product is transported with position data thereof given by a control unit; and each food product is transferred at a preset position on a receiving surface with a food product discharge end section of the conveyor being caused to withdraw at a speed corresponding to the position data thereof.

Further, the present invention provides an apparatus for transferred foods or the like, in which food products being transported on a conveyor in a column are mounted on a receiving surface in a lined up condition with a food product discharge end section of the conveyor being caused to withdraw, the receiving surface being arranged downstream of the conveyor. In such apparatus, a food product detecting sensor is arranged so as to be fixed to a frame section of the mounting apparatus; a sensor for detecting a transfer distance of the conveyor is arranged; and a control unit for receiving signals from the sensors and outputting a signal. for operating the food product discharge end section is arranged.

DETAILED DESCRIPTION OF THE PREFERRED EMBODIMENTS

Figure 1:
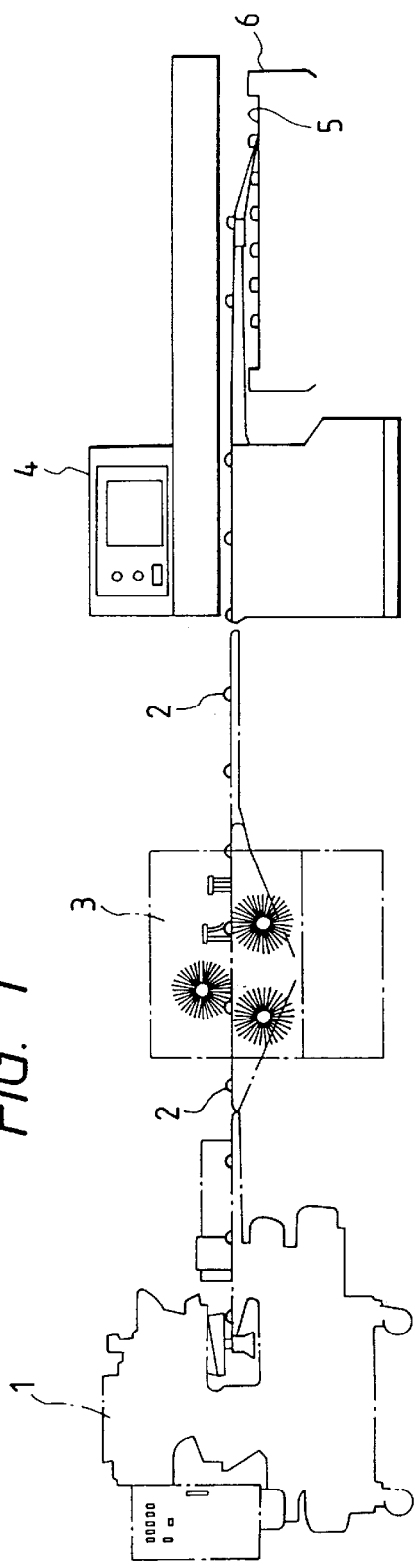
FIG. 1 is a side view showing the entire part of an embodiment of the present invention.
Figure 2:
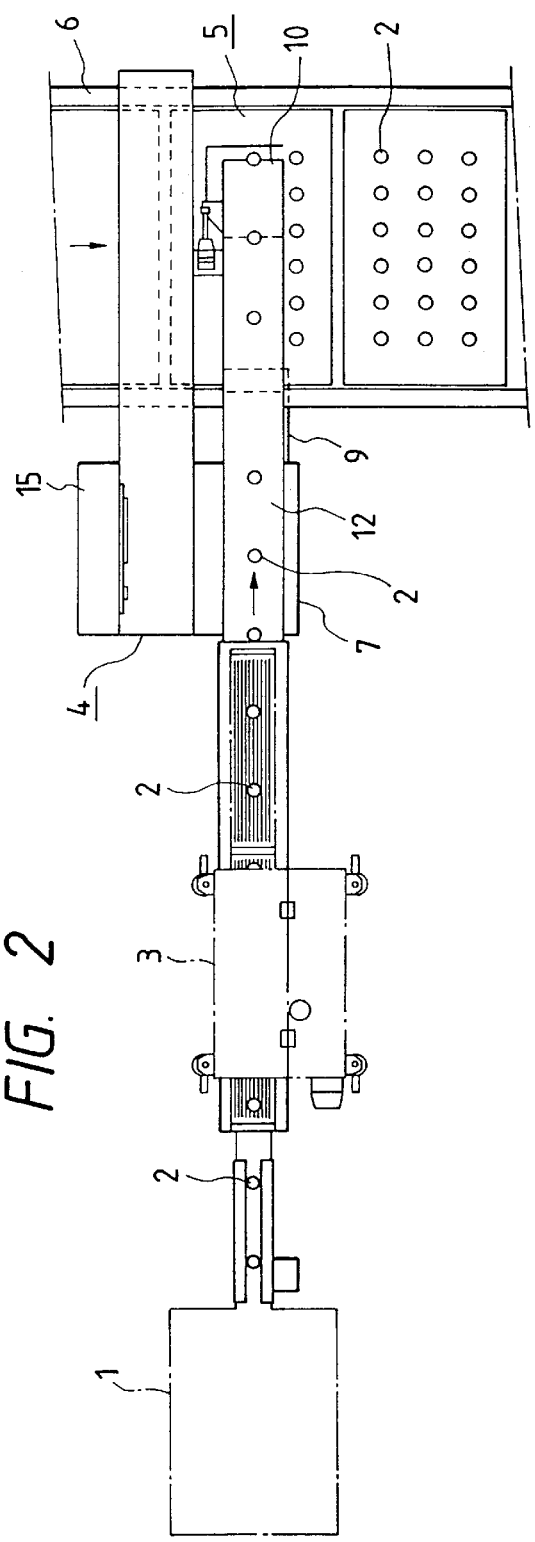
FIG. 2 is a top view showing the entire part of the embodiment of the present invention.

Embodiments of the present invention will now be described with reference to FIGS. 1 to 7 taking as an example a case in which spherical Japanese confections such as "manju" (a bun with a sweetened red bean jam filling) are made.

Reference numeral 1 denotes a food product making unit (e.g., an N208 type automatic sweetened red bean jam stuffing machine manufactured by the present applicant); and 2, a food product made by the food product making unit 1.

Downstream of the food product making unit 1 is a powder shake-down machine 3 for shaking powder that has deposited over the food product 2 down with brushes arranged on four sides, i.e., on the upper, lower, right, and left sides. Further, downstream of the powder shake-down machine 3 is a lining-up/mounting unit 4.

Downstream of the lining-up/mounting unit 4 is a transfer conveyor 6 that transfers a tray 5 that receives the food products 2.

A construction of the lining-up/mounting unit 4 will be described. The lining-up/mounting unit 4 has a conveyor plate 8 fixed to a conveyor frame 7, an axially shuttling retractable plate 9 downstream of the conveyor plate 8, and a discharge end section 10 on the downstream end of the retractable plate 9.

Below the conveyor plate 8 are three sets of idle pulleys 11. An endless belt 12 is installed onto the conveyor plate 8, the retractable plate 9, the discharge end section 10, and the idle pulleys 11.

The endless belt 12 continuously rotates in a fixed direction by a belt drive motor 13. The belt drive motor 13 has a sensor for detecting a transfer distance of the endless belt 12 for the same drive system. For example, a rotary encoder 14 is arranged as such sensor.

Data from the rotary encoder 14 is applied to a control unit 15.

The base of the discharge end section 10 is journaled to the retractable plate 9 through a pivot shaft 16, so that the discharge end section 10 can pivot only an angle θ.

This angle θ is adjustable by the distance between the discharge end section 10 and the receiving surface of the tray 5.

The discharge end section 10 can be oscillated (swivelled) by coupling a rod end 18 of an air cylinder 17 arranged close to the oscillating shaft 16 to the base of the discharge end section 10 and by causing the rod end 18 to expand and contract.

Figure 3:
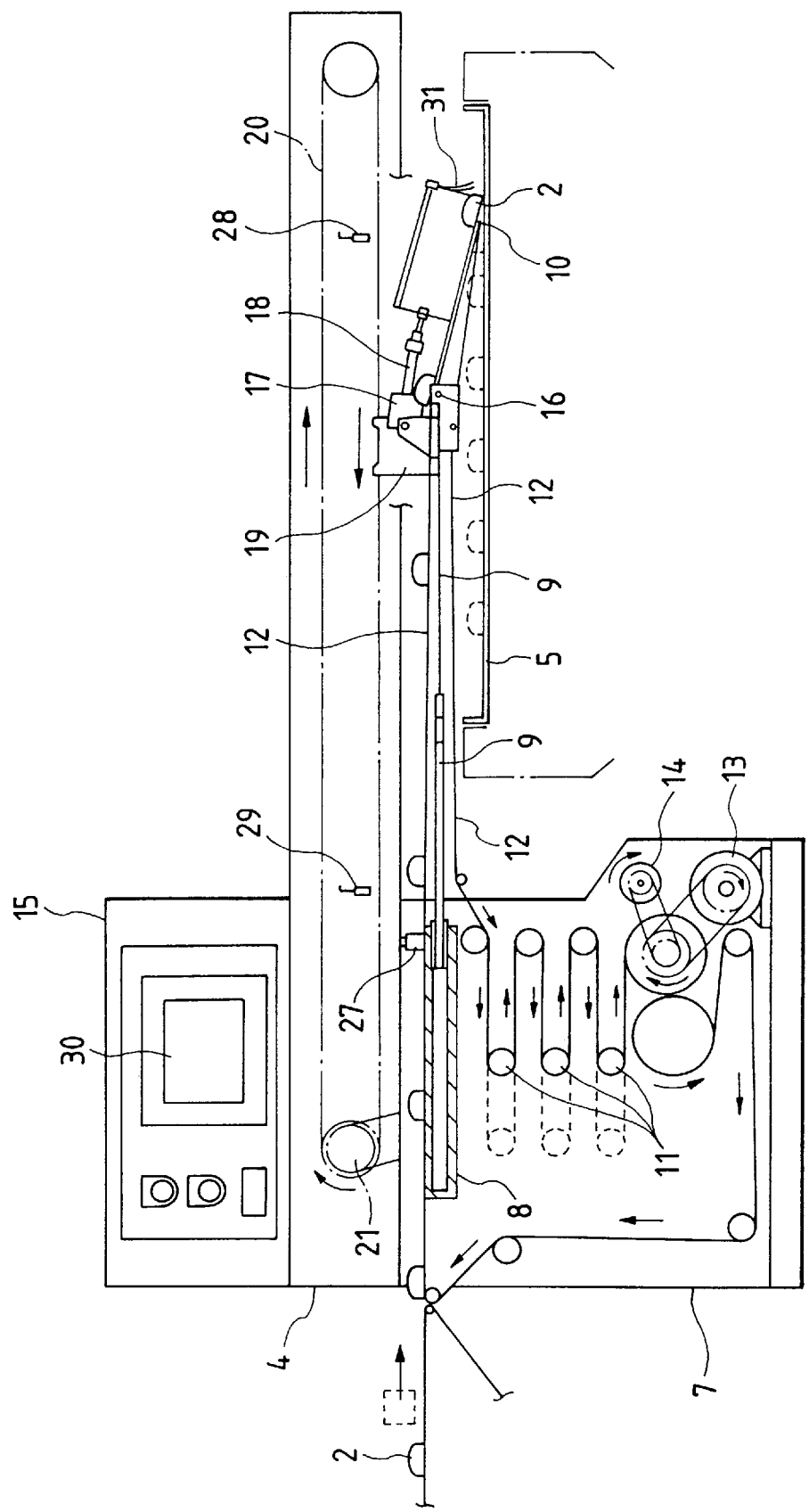
FIG. 3 is a side view showing an operation of a lining up unit, which is an embodiment of the present invention.
Figure 4:
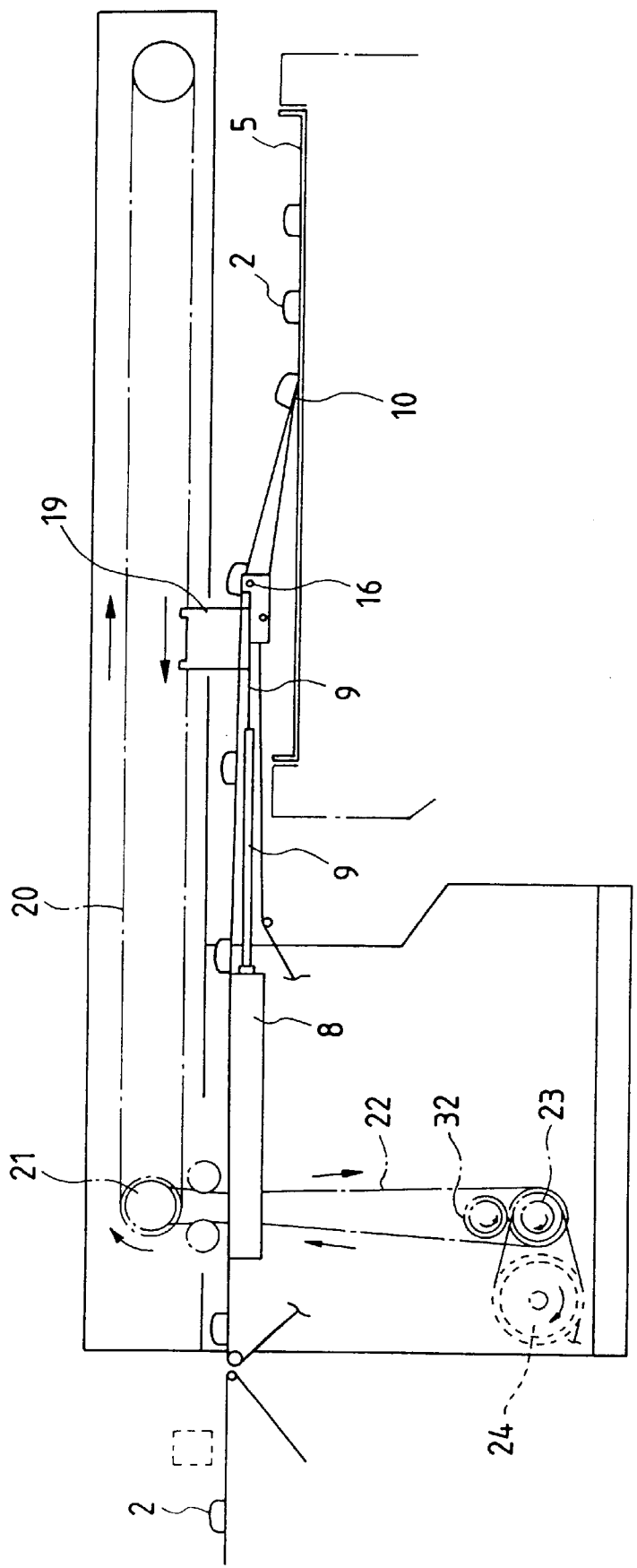
FIG. 4 is a side view showing an operation of the lining up unit, which is the embodiment of the present invention.

As shown in FIGS. 3 and 4, a guide 19 is secured to a lateral side downstream of the retractable plate 9. The guide 19 is secured to a chain 20. The chain 20 is installed around a sprocket 21 so as to extend in parallel with the retractable plate 9. The drive force of a motor 24 is transmitted to the chain 20 through the sprocket 21, a chain 22, and a gear 23.

Further, the three sets of idle pulleys 11 are made of a resin material that is light so that the use of a plurality of pulleys will not burden the driving of the motor.

Figure 5:
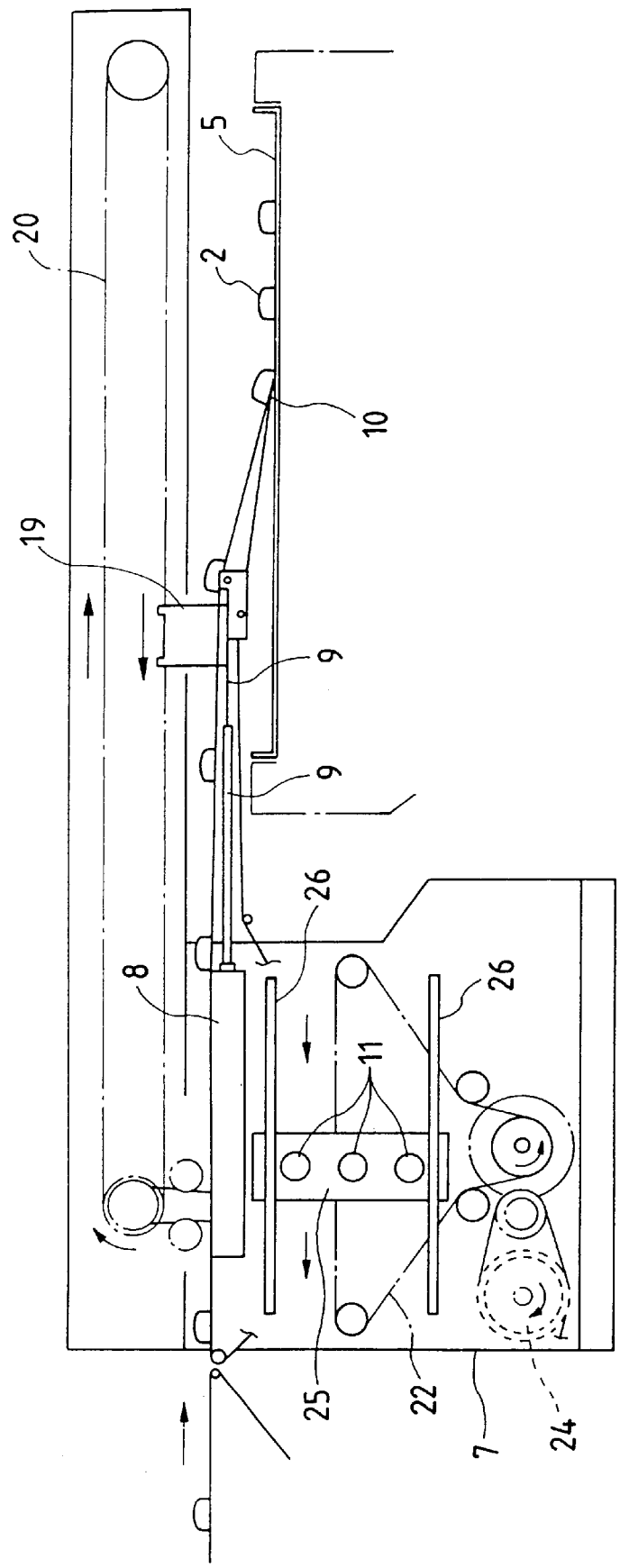
FIG. 5 is a side view showing an operation of the lining up unit, which is the embodiment of the present invention.

As shown in FIG. 5, the idle pulleys 11 have one sides thereof fixed to a plate 25 so as to be rotatable.

The plate 25 is slidably mounted on a pair of rails 26 that is secured inside the conveyor frame 7, the pair of rails 26 extending in parallel with each other, one up and the other down.

Further, since the chain 22 that transmits the motor 24 drive and the plate 25 are secured to each other, the idle pulleys 11 can move in the axial directions of the system by the drive of the motor 24.

A food product detecting sensor 27 is attached to a predetermined position of the conveyor frame 7 that is fixed, the predetermined position corresponding to the endless belt 12. The food product detecting sensor 27 is used to detect the presence and length of a food product 2 that is being transported.

A sensor 28 detects a machine zero in the movement of the discharge end section 10 in the advancing direction; and 29, an overrun preventing position detecting sensor in the withdrawing direction that is opposite to the advancing direction.

Reference numeral 15 denotes the control unit. All signal data from the rotary encoder 14, the food product detecting sensor 27, the mechanical origin detecting sensor 28, the overrun preventing position detecting sensor 29, and a touch panel 30 are applied to this control unit 15 and logically operated.

A brush 31 prevents the food product 2 from falling during mounting operation.

Then, an operation of this embodiment will be described.

The food product 2 is successively transferred to the lining-up/mounting unit 4 from the food product making unit 1. The lining-up/mounting unit 4 mounts the food product 2 by causing the discharge end section 10 to withdraw in response to a control unit 15 command while keeping the endless belt 12 of the lining-up/mounting unit 4 continuously rotating.

As a result of this mounting operation, the food products 2 are lined up on the receiving surface of the tray 5 on the transfer conveyor 6. The transfer conveyor 6 repeats the operation of transferring the tray 5 a predetermined interval.

As shown in FIGS. 3, 4, 5, the movement of the discharge end section 10 in the axial directions is made by forwardly or reversely rotating the sprocket 21 with the drive motor 24 so that the guide 19 coupled to the chain 20 is caused to move in the horizontal directions.

As a result of this operation, the discharge end section 10 moves in the axial directions. The slackening of the endless belt 12 brought about by the discharge end section 10 moving in the axial directions is prevented by the three sets of idle pulleys 11 being caused to move in the same direction.

By arranging three sets of idle pulleys 11 and causing such idle pulleys to move in the same direction, the slackening of the endless belt 12 can be absorbed with only a small area occupied.

The food product detecting sensor 27 is attached to the conveyor frame 7, and the rotary encoder 14 for detecting the transfer distance of the endless belt is attached to the rotary shaft of the motor 13. The signals from these sensors and a preset mounting interval at which a food product 2 is mounted on the tray 5 are logically operated by the control unit.

As a result of such logic operation, food products that are being transferred at irregular intervals can be mounted at a desired interval by controlling the discharge end section 10 withdrawing speed with the endless belt 12 transferring speed left unchanged.

A withdrawing speed control means of the discharge end section 11 will hereunder be described.

Figure 6:
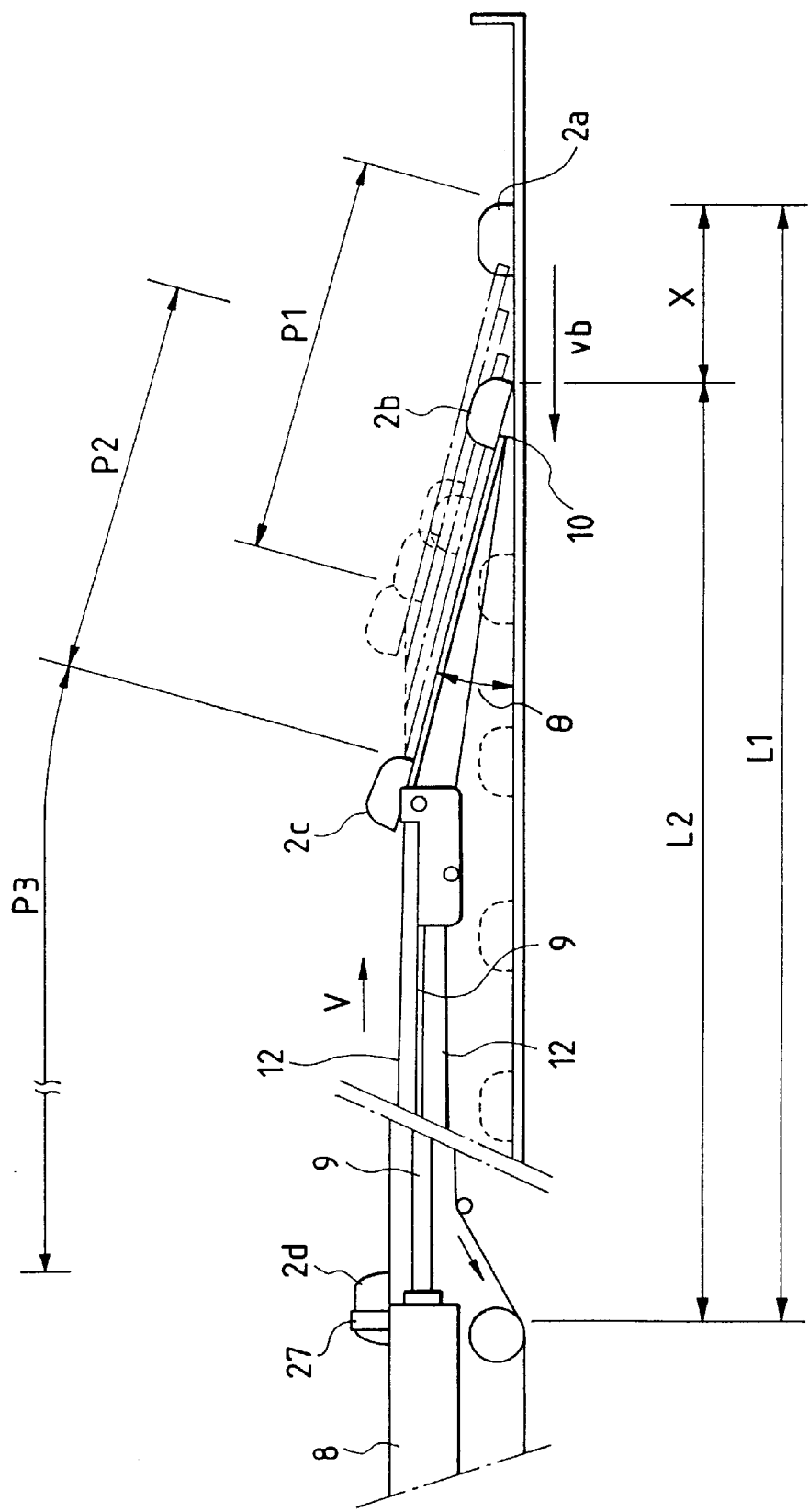
FIG. 6 is a diagram illustrative of an operation of a discharge end section of the lining up unit shown as the embodiment at a mounting start timing of the discharge end section.
Figure 7:
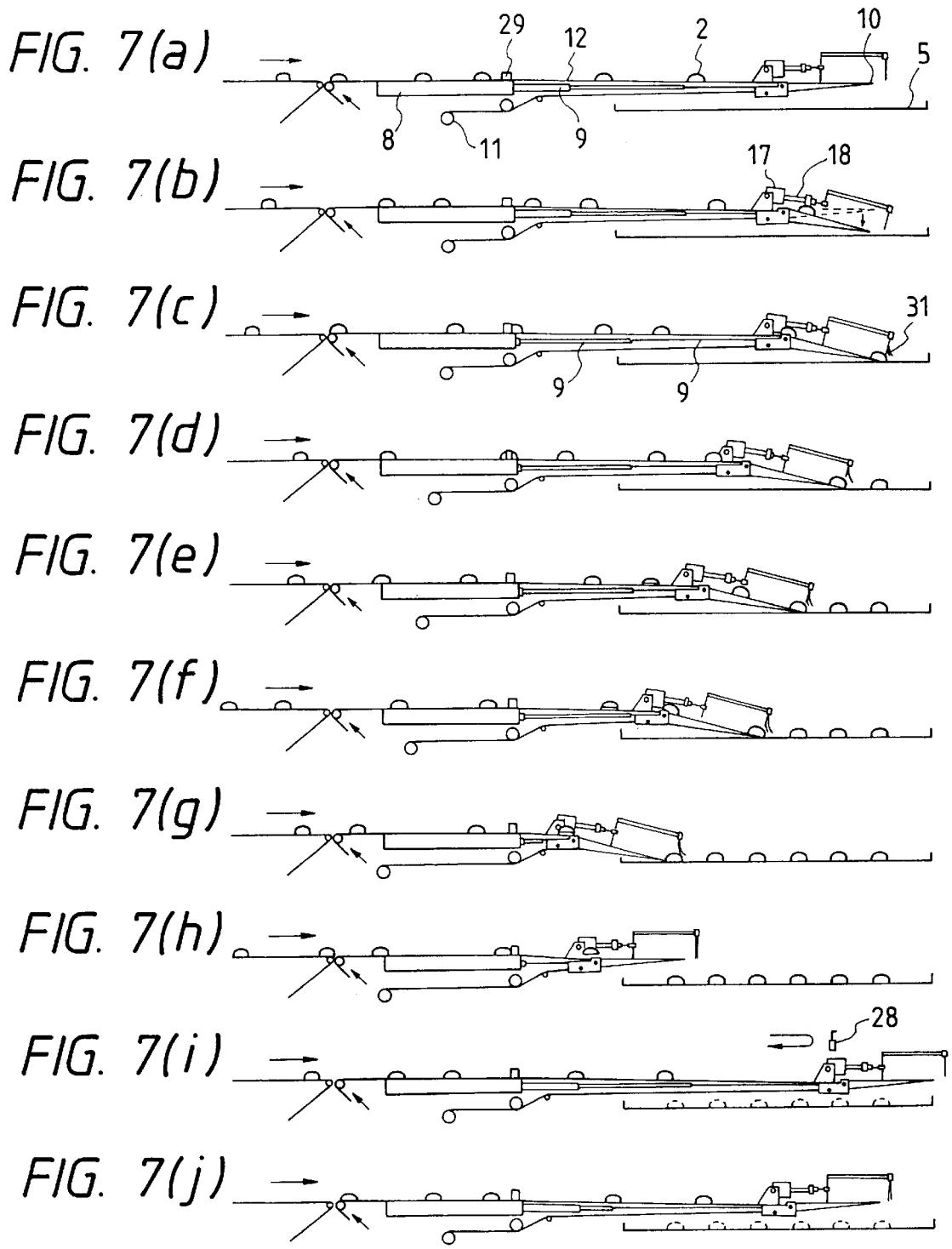
FIGS. 7(a) to 7(j) show a mounting operation of the lining up unit shown as the embodiment.

FIG. 6 shows a condition in which the operation of mounting a food product 2 from the discharge end section 10 of the lining-up/mounting unit 4 onto a tray 5 is just started. The time between a timing at which a heading food product 2a has been detected and a timing at which such food product 2a has reached the downstream end position of the discharge end section 10 can be obtained by sensing the food product 2a with the food product detecting sensor 27 and logically operating at the control unit 15 both the signal from the food product detecting sensor 27 and a pulse signal sent from the belt moving distance detecting rotary encoder 14. That is, the food product 2a mounting timing can be thus found.

Therefore, as shown in FIG. 6, the food product 2a that has been transferred at a transfer speed V of the endless belt 12 is mounted onto the receiving surface of the tray 5. A succeeding food product 2b is nearing the already mounted food product 2a at the speed V.

In order to mount the food product 2b at a predetermined position, i.e., at a position a distance L2 away from the sensor 27 (hereinafter referred to the "position L2" where applicable), the discharge end section 10 must be withdrawn a distance equal to a preset mounting interval X by withdrawing operation.

Therefore, the timing at which the food product 2b is mounted at the mounting position L2 equals a time required for an interval P1 between the food products 2a and 2b to equal the preset mounting interval X, and can therefore be found by the following equation (P1−X)/V (s) that is given by a change in the position of the food product 2b due to withdrawing operation of the discharge end section 10 and the transfer speed V of the endless belt 12.

By causing the discharge end section 10 to move the target mounting interval X (mm) within the same time as the calculated required time, a predetermined interval can be maintained between products. A relational expression of the withdrawing speed vb of the discharge end section 10 at that time is given as:

$$vb = X \cdot V/(P1-X) \text{(mm/s)}.$$

Further, the withdrawing speeds of the succeeding food products 2c, 2d are similarly determined by their intervals (P2, P3) and target mounting interval (X).

The foregoing can be summarized as follows. Distances L1, L2, . . . between the food product detecting sensor 27 position and the food product mounting positions that are pitched at the equal interval X are set in advance.

Intervals P1, P2, P3 . . . are measured by the detection of the passage of transferred food products with the food product detecting sensor 27 and with the rotary encoder 14, and the measured values are stored in the control unit 15. The control unit 15 has already been informed of the transferring distance of each food product 2 by a rotary encoder 14 signal.

A food product 2 mounting operation sequence will be described.

(1) First, when the control unit 15 is informed of the arrival of a food product 2 at a position L1 by the position data from the rotary encoder, the control unit 15 issues a signal for withdrawing the discharge end section 10 to thereby start a mounting operation for a group of food products (the group consisting of food products to be mounted with a single stroke).

(2) The withdrawing speed in item (1) is set to such a value as to allow the interval P1 between the food products 2a and 2b to equal the mounting interval X.

(3) Upon end of mounting the food product 2b (the arrival of the food product 2b at the position L2 is informed by the position data from the rotary encoder 14), the control unit 15 specifies a withdrawing speed to the discharge end section 10, so that the withdrawing speed is switched to the specified speed for mounting a food product 2c.

(4) The discharge end section 10 withdraws with the withdrawing speed thereof increased or decreased in accordance with the intervals P1, P2, P3 . . . until the operation of mounting the group of food products ends, and after the mounting operation for the group of food products has been completed, the discharge end section 10 advances to the initially set advancing position. Then, the operation of mounting another group of food products is started.

It may be noted that the last withdrawing speed of the discharge end section 10 for a group of food products is set to an average of all the withdrawing speeds of the food products which have already mounted for convenience in this embodiment.

It is also noted that the food product detecting sensor 27 is preferably attached to a sufficiently remote position upstream of the discharge end section 10, but that the distance between the discharge end section 10 and the food product detecting sensor 27 is at least larger than the interval between the food products 2.

While the endless belt 12 is continuously operated and the discharge end section 10 is continuously withdrawn in this embodiment, the present invention may be applicable to the following embodiment as well.

For example, a detecting sensor 33 (close to the downstream end of the powder shake-down machine 3 indicated by the broken lines in FIGS. 3 and 4) is arranged on a transfer and supply unit (which is the powder shake-down machine 3 in this embodiment) of food products disposed upstream of the endless belt 12.

This detecting sensor 33 is designed to resume the once-stopped operation of the endless belt 12 and the discharge end section 10. That is, if the interval between food products is unexpectedly increased due to omitting or the like during upstream processes, the discharge end section 10 reaches the next mounting position before the corresponding food product reaches the discharge end section even if the discharge end section 10 withdrawing speed is reduced, and as a result, such food product cannot be mounted at the predetermined mounting position. To allow a food product to be mounted at a predetermined mounting position, the operation of the endless belt 12 and the discharge end section 10 is once stopped, then this detecting sensor 33 is activated to detect the food product, and upon detection of the food product, the endless belt 12 and the discharge end section 10 are caused to resume their operation.

As a result of the above operation, too large an interval between food products due to omitting or the like during upstream processes can be corrected so that the food products can be mounted at the predetermined positions.

Still further, the withdrawing interval of the last food product is not necessarily set to X (mm); what is necessary is simply that a withdrawing interval long enough to mount a food product 2 be provided. That is, since the length of a food product 2 can be measured by counting the number of pulses from the rotary encoder 14 as from the timing at which the food product detecting sensor 27 has detected the food product 2, a withdrawing interval long enough to mount the food product 2 may be determined by the control unit 15 in accordance with the measured length every time a food product 2 is to be mounted.

As a result of such operation, the discharge end section 10 will in no way start advancing before the operation of mounting the last food product 2 is ended. Hence, inconvenience such as the discharge end section 10 oscillating and elevating to jump a food product up or to cause a food product to fall can be prevented.

Further, too large a withdrawing distance of the last food product 2 disadvantageously allows a next food product 2 to arrive too soon, which in turn causes the next food product 2 to drop from the discharge end section 10 and hence makes it impossible to mount the next food product at a predetermined position. However, since the minimally necessary withdrawing distance can be determined by a signal from the rotary encoder 14 in this embodiment, such inconvenience in no way occurs, either.

FIGS. 7(a) to 7(j) present a flow of mounting stroke to indicate an operation of the lining-up/mounting unit 4 in more detail.

In FIG. 7(a), the discharge end section 10 waits at the initial mounting position (origin).

As shown in FIG. 7(b), the discharge end section 10 is oscillated at a preset timing to get ready for mounting operation.

In FIG. 7(c), a food product 2 has reached the discharge end section 10, and the discharge end section 10 starts withdrawing.

As shown in FIG. 7(d), when a second food product 2 has reached the discharge end section 10, and if the interval between the food products on the endless belt 12 is larger than that in the last mounting operation, the discharge end section 10 continues withdrawing with the withdrawing speed thereof decreased.

As shown in FIG. 7(e), when a third food product 2 has reached the discharge end section 10, and if the interval between the food products on the endless belt 12 is shorter than in the case 7(d), the discharge end section 10 continues withdrawing with the withdrawing speed thereof increased.

In FIG. 7(f), a fourth food product is being mounted.

In FIG. 7(g), the last food product 2 in a group of food products has been mounted with the discharge end section 10 withdrawing at an average withdrawing speed, and then the discharge end section 10 is ready to start elevating and oscillating.

In FIG. 7(h), the discharge end section 10 starts returning toward the mechanical origin at a high speed without interfering with the food products 2 that have already been mounted. The returning speed of the discharge end section 10 must be much higher than the speed V of the endless belt 12. The reason is that the discharge end section 10 must return to the mounting position (initial position) of a heading food product that belongs to a next group of food products.

In FIG. 7(i), a discharge end section 10 moving position detecting rotary encoder 32 senses the discharge end section 10 nearing the origin by counting the number of pulses thereof, and when such condition has been sensed, the discharge end section 10 moving speed is reduced from the high speed so that the discharge end section 10 reaches the origin at a reduced speed, and the discharge end section 10 stops there once, and thereafter starts withdrawing toward the mechanical origin that is the initial mounting position.

The reason why the discharge end section 10 moving speed is reduced from the high speed is to reduce the load at the time of reversing the direction of the discharge end section 10.

In the meantime, the group of food products for which the mounting operation has been completed this time has moved a single interval in the direction of movement of the transfer conveyor 6, so that the transfer conveyor 6 is ready to receive the next group of food products.

In FIG. 7(j), the lining-up/mounting unit 4 has returned to the initial condition indicated in item 7(a).

Figure 8:
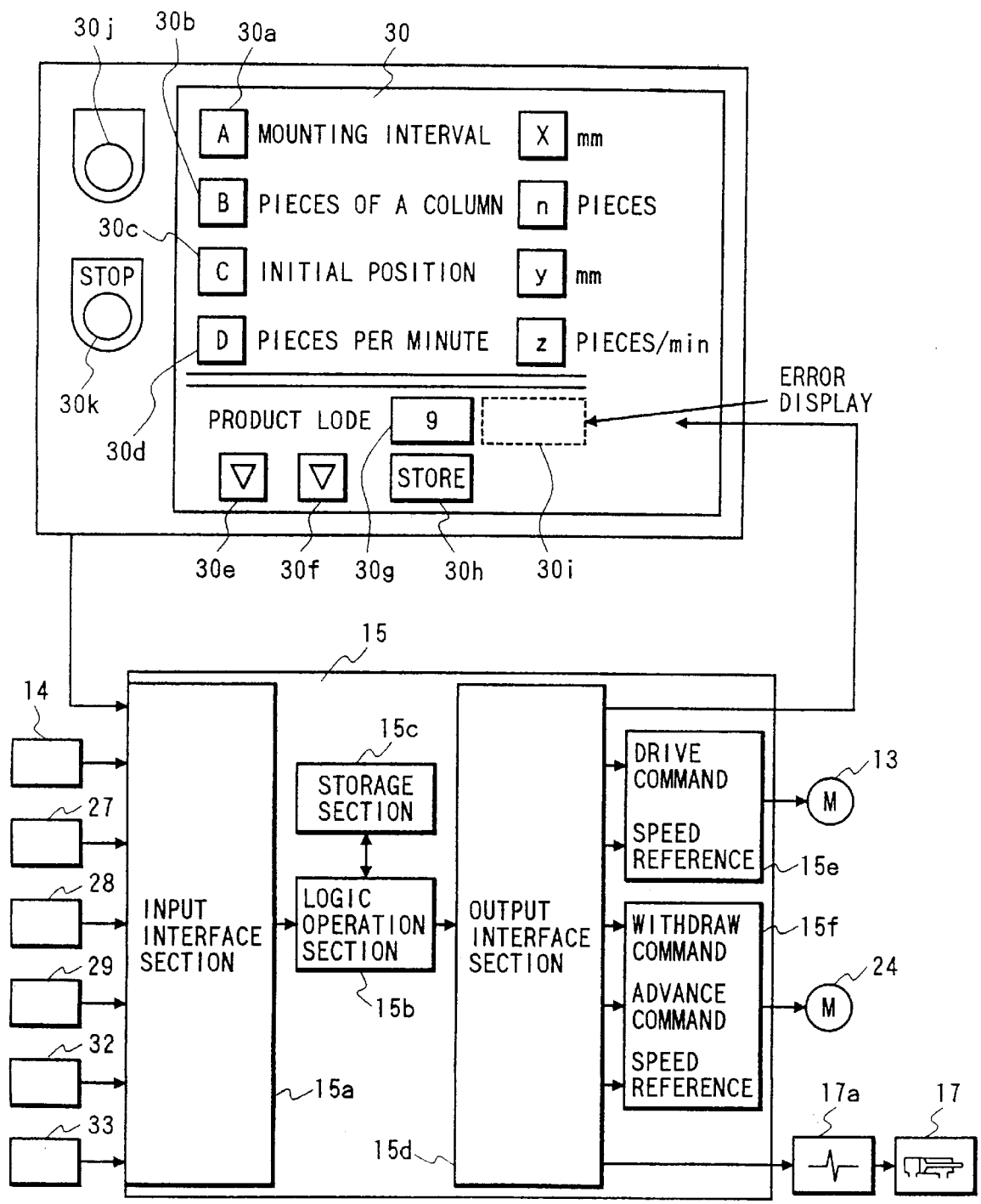
FIG. 8 is a block diagram of an electric control system according to the present invention.

FIG. 8 is a block diagram of an electric control system including the control unit 15 according to the present invention.

In the control unit 15, a logic operation section 15b is connected to a storage section 15c so that the logic operation section 15b can write and read data to and from the storage section 15c.

In the control unit 15, the logic operation section 15b is connected to an input interface section 15a so as to read a generated signal from an external electric signal generator through the input interface section 15a.

In the control unit 15, the logic operation section 15b is connected to an output interface section 15d so as to output a command signal to an external controlled electric device through the output interface section 15d.

The output interface section 15d is connected so that an operation command and a speed reference can be given to a speed change gear 15e for an endless belt 12 drive motor.

The output interface section 15d is connected so that a withdraw command, an advance command, and a speed reference can be given to a withdraw/advance/speed change gear 15f for a discharge end section 10 advance/withdraw drive motor.

The touch panel 30 has an output thereof connected to the input interface 15a and an input thereof received from the output interface 15d. The touch panel 30 is designed to be operated by the storage section 15c and the logic operation section 15b that are programed in such a manner that mounting pattern set values stored in the storage section 15c can be freely altered and displayed through the touch panel 30 and that an inoperable erroneous set value 30i inputted by the operator and mechanical abnormalities such as overload of a motor and overshoot of the discharge end section 10 in the withdraw direction can be displayed.

The touch panel 30 allows a plurality of mounting patterns to be stored in the storage section 15c of the control unit 15 by touching a storage key 30h with a finger under the control of a product code number 30g. By touching product code number up/down keys 30f, 30e with a finger, a desired product code number 30g is displayed. Then, by pressing an activation button 30j, a mounting pattern that corresponds to the displayed product code number 30g and that is stored in the storage section 15c can be called by the logic operation section 15b and is made ready to be operated.

When power has been turned on, the logic operation section 15b automatically calculates an optimal rotational speed of the endless belt 12 by referring to per-minute mounting capacity ((z) pieces/minute) 30d in the touch panel 30, and then gives a corresponding speed reference to the endless belt drive motor speed change gear 15e. The optimal rotational speed is calculated as a medium average speed that allows the withdraw speed of the discharge end section 10 to be adequately increased or decreased.

(Even if the rotational speed reference has been given, the endless belt drive motor 13 is not activated; the endless belt drive motor 13 only gets ready to be activated at such rotational speed.)

At the very first time power has been turned on, the discharge end section 10 must be moved to the initial mounting origin. Therefore, when the activation button 30j has been pressed, the discharge end section 10 is once caused to advance, then is caused to stop upon reception of an ON signal from a mechanical origin detecting sensor 28, and then is caused to withdraw y mm with the initial mounting set position (y) 30c in the touch panel 30 referred to, and is finally caused to stop there. The positioning of the discharge end section 10 at the initial mounting origin can be thus completed.

At the same time, a distance from a food product detecting sensor 27 to the initial mounting position is calculated, and the calculated value is stored in the storage section 15c. The stored value is used as a comparative reference that serves as a mounting start (withdraw start) timing.

When food products 2 are being transferred on the endless belt 12, the food product detecting sensor 27 turns on. At the same time, the logic operation section 15b starts counting pulses sent from the endless belt 12 transfer distance detecting rotary encoder, and detects a first food product in a first column, measures the length of the first food product 2, detects a second food product in the first column, measures the length of the second food product 2, measures the distance between the first food product and the second food product, and so on for all food products in a plurality of columns, and then stores the measured values in the storage section 15c continuously.

(The total number of food products that can be mounted on the endless belt 12 on the downstream side of the food product detecting sensor 27 may, in some cases, correspond to a plurality of columns of food products that have already been mounted, depending on the values set to the target mounting interval (X) 30a and the number of food products in a single column (n) 30b. It is for this reason that the measured data for such total number of food products must be stored in the storage section 15c.)

Upon detection of a heading food product 2 in a column by the food product detecting sensor 27, the logic operation section 15b starts counting pulses sent from the endless belt 12 transfer distance detecting rotary encoder 14, and continues comparing the counted pulses with the comparative reference. When the difference between the counted pulses and the comparative reference takes a predetermined value, it is the timing at which the heading food product 2 in the column to be mounted has neared the discharge end section 10. Therefore, a discharge end section 10 angle oscillating air cylinder 17 drive solenoid valve 17a is turned on, so that the discharge end section 10 is lowered to be ready to perform soft mounting operation.

(The reason why the discharge end section 10 is not oscillated to a lower position from the outset is to give the transfer conveyor 6 sufficient time for getting ready to receive a next food product thereon after the last food product 2 immediately below the endless belt 12 has moved a predetermined interval in the transfer conveyor 6 flowing direction.)

Further, either the timing at which both values coincide with each other or the timing at which the counted pulses exceed the comparative reference is the mounting start (withdraw start) timing. Therefore, it is at this timing that a withdraw command and a calculated withdraw speed reference corresponding to such food product 2 are given to the discharge end section 10 drive motor speed change gear 15f. As a result, the discharge end section 10 starts withdrawing.

Then, the logic operation section 15b is informed that the discharge end section 10 has withdrawn the target mounting interval (X) 30a by counting pulses sent from a discharge end section 10 advance/withdraw distance detecting encoder 32. Therefore, every time the discharge end section 10 withdraws X mm, the logic operation section 15b switches the calculated withdraw speed so as to correspond to the food product 2 concerned and outputs the switched withdraw speed to the discharge end section 10 advance/withdraw drive motor speed change gear 15f. After this operation has been repeated for a number of times that is equal to the total number of food products to be mounted in a single column (n) 30b minus 1, the discharge end section 10 still has to withdraw for the last food product 2 in the same column. Therefore, the logic operation section 15b automatically calculates a minimum optimal withdraw distance of the discharge end section 10 for the last food product 2 through the length of the last food product 2, the endless belt 12 moving speed, and the discharge end section 10 withdraw speed (the average of the withdraw speeds of the food products up to the penultimate food product in the same column is set for the last food product) with an inertial overshoot taken into account. When the discharge end section 10 has been caused to withdraw the calculated minimum optimal withdraw distance, the logic operation section 15b stops outputting the withdraw command. Then, the logic operation section 15b turns off the discharge end section 10 angle oscillating air cylinder 17 drive solenoid 17a so that the discharge end 10 is elevated, and at the same time, gives an advance command and a maximum advance speed reference to the discharge end section 10 advance/withdraw drive motor speed change gear 15f so that the discharge end section 10 is caused to advance to reach the mechanical origin 27, to reach the initial mounting origin, and to stop. The same operation is repeated thereafter.

Too large a distance between food products 2 on the endless belt 12 brings about too slow a discharge end section 10 withdraw speed. As a result, the soft food products 2 are pushed by the endless belt that is rotating at a constant speed, and therefore the food products become easily deformed while they are being mounted. In order to prevent such deformation of the food products, the following two types of measures are currently taken.

(a) Even if the total number of food products to be mounted in a column (n) 30b has not been mounted, the withdraw operation is terminated with the one on the downstream side of any two excessively distanced food products 2 as the last food product to be mounted. (In this case, a vacancy is produced on the receiving tray 5, but this has not imposed serious problems in many cases so far.)

(b) If there should be no vacancy on the receiving tray 5, another food product 2 detecting sensor 33 is arranged in the vicinity of the entrance end of the endless belt 12. That is, the rotation of the endless belt 12 is temporarily stopped on condition that the distance of the empty endless belt 12 portion from the last food product 2 exceeds a predetermined value. When a new food product is being transferred, such food product is detected by the sensor 33, and the operation of the endless belt 12 is resumed. However, if the discharge end section 10 is being caused to withdraw when the endless belt 12 has been temporarily stopped, then the discharge end section 10 is caused to stop after completing the mounting operation of the food product 2 that is being mounted at that time and before starting the mounting operation of the next food product 2. In this case, the endless belt 12 is stopped in synchronism with the stoppage of the discharge end section 10. (Unless both components are stopped and activated in synchronism with each other, the set positional relationship between the food product 2 on the endless belt 12 and the mounting position of the receiving tray 5 is lost.)

The food product 2 detecting sensor 33 disposed in the vicinity of the entrance end of the endless belt 12 can be omitted if the food product 2 detecting sensor 27 is moved to the vicinity of the entrance end of the endless belt 12.

The discharge end section 10 advance/withdraw distance detecting encoder 32 may be of a rotary type, a linear type, or as in this embodiment an absolute position code generating type instead of a pulse train generating type. Further, it is theoretically possible to omit this encoder 32 by counting clock time within the logic operation section 15b and converting the counted clock time into time or rotational speed of the endless belt 12 or by counting pulses from the endless belt 12 transfer distance detecting rotary encoder and converting the counted pulses into discharge end section 10 advance/withdraw distance.

The encoder 32 that can provide actual discharge end section 10 advance/withdraw distances is employed in this embodiment because such encoder 32 is advantageous in, e.g, allowing a simple program to be used and accurate logic operation to be implemented.

FIG. 8 is a block diagram of an electric control system according to the present invention. While the food products are transferred and supplied in a column in this embodiment, the present invention does not limit the transferring and supplying mode to this example. Food products can be transferred and supplied in a plurality of columns.

For example, in the case where the receiving surface under the mounting unit is a flat plate, food products supplied in a plurality of columns can be mounted by the row (a row of food products extend in a direction perpendicular to the transfer direction). In this case, the food products belonging to each row (the row extending in the direction perpendicular to the transfer direction of the endless belt 12) that are being transferred in a plurality of columns are transferred so as to be lined up in advance by a preliminary lining up means (not shown) such as lining up plates, so that even if the food products are not pitched at a regular interval in each row, such food products can be mounted at predetermined positions on the receiving surface by the mounting unit of the present invention.

As described in the foregoing, the present invention is characterized as not only allowing food products made by the food product making unit and being transferred at irregular intervals during intermediate processes to be mounted at a preset interval, but also automatically lining up the food products through smooth and continuous mounting movement of the discharge end section without giving excessive impact onto the mechanical units, so that the food products can be mounted on a receiving surface such as a tray, a belt, and a band oven correctly.

Therefore, food products can be mounted on a predetermined position of a tray, a container, or the like that have projections and recesses on the surface.

In addition, since the discharge end section continuously withdraws, a unit for intermittently stopping the discharge end section which has been necessary in the conventional example is no longer required.

Moreover, the discharge end section return start timing after the completion of one round of mounting operation, which has been determined on a trial and error basis by the operator in the past, can be set by the control unit automatically. Therefore, the present invention can provide a food product mounting means that is easy to operate even in handling a plurality of mounting patterns.

What is claimed is:

1. A method for transferring articles, comprising the steps of:
   (a) transporting the articles on a continuously moving conveyor in a longitudinal direction;
   (b) detecting the article by an article detecting sensor attached to a predetermined position of the conveyor, wherein the article detecting sensor transmits position data of the article to a control unit, and wherein each article is transported with the position data thereof given by the control unit; and
   (c) transferring each article to a preset position on a receiving surface with an article discharge end section of the conveyor being caused to continuously withdraw at a speed corresponding to the position data thereof, wherein when discharging the articles, the article discharge end withdraws in a singular direction.

2. The method according to claim 1, further comprising the step of:
   (d) absorbing slacking of the conveyor by plural sets of idle pulleys.

3. The method according to claim 1, further comprising the step of:
   (e) keeping a speed of conveyor constant.

4. The method of claim 1, wherein the receiving surface is stationary in the direction of the article discharge end.

5. An apparatus for transferring articles on a receiving surface in a lined up condition, comprising:
   a conveyor for transporting the articles in a longitudinal direction;
   a conveyor sensor for detecting a transfer distance of the conveyor;
   a frame section;
   an article detecting sensor fixed to the frame section, for detecting the article transported by the conveyor;
   an article discharge end section reciprocatable with respect to the frame section; and
   a control unit for receiving signals from the conveyor sensor and the article detecting sensor, and outputting a signal to continuously withdraw the article discharge end section in accordance with the signals from the sensors; and
   the receiving surface for receiving an article, wherein when discharging the article to the receiving surface, the discharge end withdraws in a singular direction.

6. The apparatus according to claim 5, further comprising:
   plural sets of idle pulleys for absorbing slackening of the conveyor.

7. The apparatus according to claim 6, wherein the control unit keeps a speed of the conveyor constant.

8. The apparatus for transferring articles of claim 5, wherein the receiving surface is stationary in the direction of the article discharge end.

9. An apparatus for transferring articles on a receiving surface in a lined up condition, comprising:
   a conveyor for transporting the articles in a longitudinal direction;
   a conveyor sensor for detecting a transfer distance of the conveyor;
   a frame section;
   an article detecting sensor fixed to the frame section, for detecting the article transported by the conveyor;
   an article discharge end section reciprocatable with respect to the frame section;
   a control unit for receiving signals from the conveyor sensor and the article detecting sensor, and outputting a signal to continuously withdraw the article discharge end section in accordance with the signals from the sensors, wherein when discharging the articles, the discharge end withdraws in a singular direction; and
   an upstream detecting sensor for detecting an absence of the article to temporarily stop the conveyor and the discharge end section; and
   the receiving surface for receiving an article.

10. The apparatus according to claim 9, further comprising:
    plural sets of idle pulleys for absorbing slackening of the conveyor.

11. The apparatus according to claim 9, wherein the control unit keeps a speed of the conveyor constant when the upstream detecting sensor does not detect the absence of the article.

12. The apparatus for transferring articles of claim 9, wherein the receiving surface is stationary in the direction of the article discharge end.

* * * * *

UNITED STATES PATENT AND TRADEMARK OFFICE
CERTIFICATE OF CORRECTION

PATENT NO. : 6,056,109
DATED : May 2, 2000
INVENTOR(S) : Masatoshi Hidai et al.

Page 1 of 1

It is certified that error appears in the above-identified patent and that said Letters Patent is hereby corrected as shown below:

Claim 7, column 12,
Line 29, "claim 6" should read -- claim 5 --.

Signed and Sealed this

Fourth Day of September, 2001

Attest:

*Nicholas P. Godici*

NICHOLAS P. GODICI
*Acting Director of the United States Patent and Trademark Office*

*Attesting Officer*